United States Patent
Utagaki et al.

(10) Patent No.: US 7,722,964 B2
(45) Date of Patent: May 25, 2010

(54) FIBER REINFORCED CEMENT BOARD AND MANUFACTURING PROCESS

(75) Inventors: Kazuo Utagaki, Nagoya (JP); Tadashi Sugita, Nagoya (JP); Satoshi Takayama, Nagoya (JP)

(73) Assignee: Nichiha Corporation, Nagoya-shi (JP)

( * ) Notice: Subject to any disclaimer, the term of this patent is extended or adjusted under 35 U.S.C. 154(b) by 823 days.

(21) Appl. No.: 11/410,311

(22) Filed: Apr. 25, 2006

(65) Prior Publication Data

US 2007/0246864 A1   Oct. 25, 2007

(51) Int. Cl.
B32B 13/00 (2006.01)
B32B 13/12 (2006.01)

(52) U.S. Cl. ............ 428/688; 428/703; 52/309.17; 106/713; 106/716; 106/724; 106/731; 106/737; 264/333

(58) Field of Classification Search ......... 428/688, 428/703; 52/309.17; 106/713, 716, 724, 106/731, 737; 264/333
See application file for complete search history.

(56) References Cited

U.S. PATENT DOCUMENTS

| | | | |
|---|---|---|---|
| 3,841,885 A | 10/1974 | Jakel | |
| 3,972,972 A * | 8/1976 | Yano et al. | 264/117 |
| 4,101,335 A | 7/1978 | Barrable | |
| 4,985,119 A | 1/1991 | Vinson et al. | |
| 5,188,889 A * | 2/1993 | Nagatomi et al. | 428/304.4 |
| 5,804,003 A | 9/1998 | Nishizawa | |
| 5,858,083 A | 1/1999 | Stav et al. | |
| 5,945,044 A | 8/1999 | Kawai et al. | |
| 6,001,169 A * | 12/1999 | Kawai | 106/696 |
| 6,138,430 A | 10/2000 | Van Acoleyen et al. | |
| 6,506,248 B1 | 1/2003 | Duselis et al. | |
| 6,572,697 B2 * | 6/2003 | Gleeson et al. | 106/705 |
| 6,605,148 B2 * | 8/2003 | Shirakawa et al. | 106/672 |
| 6,676,745 B2 | 1/2004 | Merkley et al. | |
| 6,872,246 B2 | 3/2005 | Merkley et al. | |

(Continued)

FOREIGN PATENT DOCUMENTS

JP   54-99131 A   8/1976

(Continued)

OTHER PUBLICATIONS

JP 49045934 A (Kuraray Co. LTD) May 2, 1974 abstract only.*

(Continued)

*Primary Examiner*—Paul Marcantoni
(74) *Attorney, Agent, or Firm*—Birch, Stewart, Kolasch & Birch, LLP

(57) ABSTRACT

Provided is a fiber reinforced cement board having good installation properties such as nail performance, flexibility performance and handling performance, as well as other favorable physical properties.

The board has an absolute dry specific gravity of not less than 1.20 and not more than 1.30 and comprises as raw materials not less than 28% by mass and not more than 32% by mass of a hydraulic inorganic material, not less than 54% by mass and not more than 58% by mass of a siliceous material, not less than 8% by mass and not more than 12% by mass of a woody reinforcement, not less than 2% by mass and not more than 5% by mass of mica, and not less than 0.5% by mass and not more than 1.25% by mass of a water-soluble resin.

15 Claims, 1 Drawing Sheet

U.S. PATENT DOCUMENTS

| | | |
|---|---|---|
| 7,344,593 B2 | 3/2008 | Luo et al. |
| 7,621,087 B2 | 11/2009 | Utagaki et al. |
| 2001/0047741 A1 | 12/2001 | Gleeson et al. |
| 2003/0205172 A1 | 11/2003 | Gleeson et al. |
| 2004/0168615 A1 | 9/2004 | Luo et al. |
| 2005/0235883 A1 | 10/2005 | Merkley et al. |
| 2006/0043627 A1* | 3/2006 | Sugita et al. ............... 264/122 |
| 2007/0245930 A1* | 10/2007 | Utagaki et al. ............. 106/716 |
| 2007/0277472 A1 | 12/2007 | Sinclair |
| 2008/0148999 A1 | 6/2008 | Luo et al. |
| 2008/0203365 A1 | 8/2008 | Gleeson et al. |

FOREIGN PATENT DOCUMENTS

| | | |
|---|---|---|
| JP | 58-110443 A | 7/1983 |
| JP | 61-256956 A | 11/1986 |
| JP | 1-320243 | 12/1989 |
| JP | 3-97644 A | 4/1991 |
| JP | 3-257052 A | 11/1991 |
| JP | 04-042875 A | 2/1992 |
| JP | 04-114937 A | 4/1992 |
| JP | 4-160045 A | 6/1992 |
| JP | 4-187552 A | 7/1992 |
| JP | 04-193748 A | 7/1992 |
| JP | 04-295072 A | 10/1992 |
| JP | 4-305041 A | 10/1992 |
| JP | 5-124845 A | 5/1993 |
| JP | 05-229859 A | 9/1993 |
| JP | 6-32643 A | 2/1994 |
| JP | 6-321602 A | 11/1994 |
| JP | 6-329457 A | 11/1994 |
| JP | 7-117027 A | 5/1995 |
| JP | 07-291707 A | 11/1995 |
| JP | 7-291763 A | 11/1995 |
| JP | 08-040758 A | 2/1996 |
| JP | 9-87001 A | 3/1997 |
| JP | 2619908 | 3/1997 |
| JP | 2730835 | 12/1997 |
| JP | 10-231161 A | 9/1998 |
| JP | 11-322395 A | 11/1999 |
| JP | 2000-264701 | 9/2000 |
| JP | 2001-158678 A | 6/2001 |
| JP | 2001-233653 A | 8/2001 |
| JP | 2001-287980 A | 10/2001 |
| JP | 2002-166406 A | 6/2002 |
| JP | 2003-146731 A | 5/2003 |
| JP | 2004-196601 A | 7/2004 |
| WO | 2006/025331 A1 | 3/2006 |

OTHER PUBLICATIONS

JP 49045935 A (Kuraray Co. LTD) May 2, 1974) abstract only.*

"Test methods of bending and impact for building boards", Japanese Industrial Standard, JIS A 1408, Japanese Standards Association, Revised Mar. 20, 2001, pp. 1-10 and Japanese and English cover pages and 1 sheet of back page. (in Japanese).

Document Summary of "Standard Specification for Portland Cement," ASTM International, 2006, 2 sheets.

Document Summary of "Standard Test Method for Covering Capacity and Volume Change Upon Drying of Thermal Insulating Cement," ASTM International, 2006, 1 sheet.

Japanese Office Action issued on January 12, 2010 in related JP Application No. 2004-251708.

Third-Party Submission document filed on Jan. 4, 2010 in related Japanese Patent Application No. 2004-251708.

Third-Party Submission document filed on Jan. 5, 2010 in related Japanese Patent Application No. 2004-251706.

Third Party Submission document filed on Jan. 5, 2010 in related Japanese Patent Application No. 2004-251707.

Third party Submission Notice issued on Jan. 28, 2010 in related Japanese Patent Application No. 2004-251708.

Third Party Submission Notice issued on Jan. 29, 2010 in related Japanese Patent Application No. 2004-251706.

Third Party Submission Notice issued on Jan. 29, 2010 in related Japanese Patent Application No. 2004-251707.

* cited by examiner

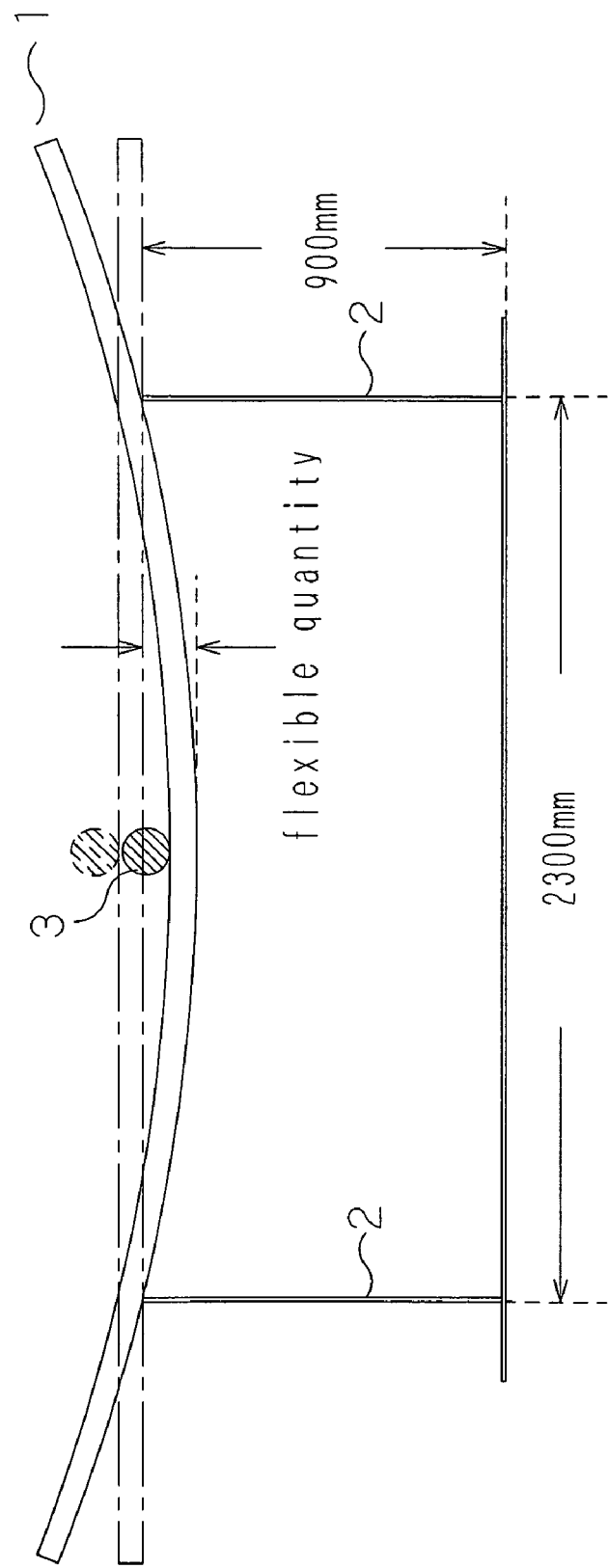

FIBER REINFORCED CEMENT BOARD AND MANUFACTURING PROCESS

CROSS-REFERENCE TO RELATED APPLICATION

PCT/JP2005/015667
U.S. patent application Ser. No. 11/215,964

BACKGROUND OF THE INVENTION

1. Field of the Invention

The present invention relates to a fiber reinforced cement board using as a raw material a hydraulic inorganic material such as cement and a manufacturing process thereof.

2. Description of the Related Art

Hitherto, fiber reinforced cement boards are generally fastened by nailing.

For example, a first fiber reinforced cement board placed downward is nailed to a sheathing at the points about 20 mm below the upper edge of the first board.

Then, the lower part of a second fiber reinforced cement board to be placed above the first board is placed on the upper part of the first board so that the front side of the upper part of the first board faces the backside of the lower part of the second board, and the second board is nailed to the sheathing at the points about 20 mm below the upper edge of the second board.

Such laminating installation method is referred to as lap boarding installation method.

Such fastening by nailing may cause breakdown, fracture or cracking of fiber reinforced cement boards when these boards are too rigid.

In order to overcome such problem, there have been discussed various reinforced boards such as the boards in which the specific gravity thereof is decreased by addition of a lightweight material to facilitate nailing.

For example, U.S. Pat. No. 6,572,697 discloses decreasing a specific gravity to 1.2 $g/cm^3$ or less by adding volcanic ashes; Kokai publication JP 2000-264701 gazette discloses addition of wood fibers having a specific length and a specific width as a reinforcing material; Japanese Patent Gazette No. 2730835 discloses addition of pulp fibers which have been divided to a specific size and synthetic resin fibers having a specific length as reinforcing materials; and Japanese Patent Gazette No. 2619908 discloses addition of pulp fibers and fibrillated hemp fibers as reinforcing materials.

However, addition of an excess amount of the above-mentioned woody reinforcement naturally leads to poor fire-resistance and extreme decrease of the specific gravity may lead to decrease in various physical properties other than nail performance, such as bending strength.

SUMMARY OF THE INVENTION

The present invention is provided to solve the above-mentioned conventional problems. Specifically, an object of the present invention is to provide a fiber reinforced cement board which is provided with good installation properties such as nail performance without leading to decrease in other various physical properties, and a manufacturing process thereof.

In order to achieve the object, the fiber reinforced cement board of the invention should have the following features; absolute dry specific gravity is not less than 1.20 and not more than 1.30; and the board contains as raw materials not less than 28% by mass and not more than 32% by mass of a hydraulic inorganic material, not less than 54% by mass and not more than 58% by mass of a siliceous material, not less than 8% by mass and not more than 12% by mass of a woody reinforcement, not less than 2% by mass and not more than 5% by mass of mica, and not less than 0.5% by mass and not more than 1.25% by mass of a water-soluble resin.

By such constitution, it is possible to obtain a fiber reinforced cement board which has good installation properties such as nail performance, flexibility performance and handling performance, as well as favorable other physical properties.

Incidentally, the term "handling performance" refers to a property of easiness in handling. For example, the term means that, when a fiber reinforced cement board is carried for installation by holding the both ends of the board by two men or by holding the center of the board by one man, excess stress is not applied to the board owing to sagging of the board to disperse a stress and thus no cracking occurs, or the board is light enough to be carried by one man. Particularly in the invention, the term refers to such flexibility sufficient to prevent cracking even when the board is carried by two men or by one man in the manner as mentioned in the above.

The present invention also provides a process for manufacturing the above-mentioned fiber reinforced cement board which comprises the following steps; preparing a slurry of raw materials by dispersing a mixture of a hydraulic inorganic material, a siliceous material and a woody reinforcement used as main raw materials in water; forming a green mat by forming the slurry through a flow on process; press-molding the green mat under a pressure not less than 2 MPa and not more than 5 MPa; and then curing the molded product in an autoclave at a temperature not lower than 150° C.

BRIEF DESCRIPTION OF THE DRAWINGS

FIG. 1 shows a schematic view illustrating a summary of the handling test of the fiber reinforced cement boards in the examples according to the present invention.

Numeral 1 represents a fiber reinforced cement board, 2 represents a supporting leg, and 3 represents a load of 1 kg. Supporting leg 2 is 900 mm in height, and the span between the two supporting legs is 2300 mm.

A dotted broken line shows a state at the start of the handling test, and a solid line shows a state where the fiber reinforced cement board is sagging.

Handling performance is experimentally evaluated to be good when the flexible quantity of the board shown in the figure is not less than 150 mm and not more than 350 mm.

DETAILED DESCRIPTION OF THE INVENTION

The present invention will be explained in detail below.
At first, each of the raw materials used for the fiber reinforced cement board is explained.

[Woody Reinforcement]

Examples of the woody reinforcement include woody pulp, woody fiber bundle, woody fiber, woody flake, woody wool and woody powder. It is preferable to use woody pulp, more particularly needle-leaves-tree unbleached kraft pulp (NUKP), needle-leaves-tree bleached kraft pulp (NBKP), Laubholz unbleached kraft pulp (LUKP) or Laubholz bleached kraft pulp (LBKP), and particularly preferably needle-leaves tree pulps such as NUKP and NBKP.

It is preferable to set the freeness of a pulp, i.e. the value measured according to Canadian standard measurement (Canadian standard freeness, hereinafter, sometimes referred to as CSF), which varies depending on the degree of beating of pulps, to be not more than 500 ml.

By using such a woody reinforcement of fine fibers, the woody reinforcement exists in a cement (powder) matrix at a high density to give a fiber reinforced cement board having an excellent toughness. Furthermore, it is possible to reduce the cost by additionally using used paper as the woody reinforcement. It is preferable to use, as the used paper, used newspapers or corrugated cardboards.

By adding the used paper in an appropriate amount, it is possible to obtain a fiber reinforced cement board excellent in handling property and nail performance.

It is preferable to use such used paper having a fiber length of not less than 0.5 mm and not more than 3.0 mm, a fiber diameter of not less than 10 μm and not more than 100 μm, and a Canadian standard freeness of not more than 350 ml.

It is also preferable to use two kinds of woody reinforcement in a ratio of NUKP (NBKP) to used paper in a range of from 4:1 to 1:1.

If the ratio of used paper to NUKP (NBKP) is more than 1:1, the resulting board contains a small amount of long fibers and thus becomes difficult to develop strength, whereas if the ratio of NUKP (NBKP) to used paper is more than 4:1, mixing with cement (powder) becomes difficult.

A woody reinforcement having a CSF of not less than 500 ml may be added as an auxiliary material.

[Hydraulic Inorganic Material]

A hydraulic inorganic material refers to a material which causes a hydration reaction upon contact with water to initiate hardening and includes cement and lime.

Among them, it is preferred to use portland cement as the hydraulic inorganic material in the present invention.

The portland cement includes ordinary portland cement, high early strength portland cement, ultra high early portland cement, moderate heat portland cement and sulfate resistant portland cement (according to ASTM (American Society for Testing and Materials international) C150, Standard Specification for Portland Cement Type I, Type II, Type III, Type IV and Type V are included). Amongst, ordinary portland cement (according to ASTM C150, Type I, Type II or a blend thereof, and according to AASHTO (American Association of State Highway and Transportation Officials) M85, Type I) is inexpensive and is suitable for the use.

Table 1

Table 1 shows an example of the analytical value of the chemical composition of the portland cement used in the present invention and the physical values thereof.

[Siliceous Material]

A siliceous material refers to a material which contains silica ($SiO_2$) as a chemical component and includes silica sand, silica powder, diatomaceous earth, silica fume, fly ash, bottom ash, blast furnace slag, steel slag and sodium silicate. It is preferable in the present invention to use at least one of blast furnace slag, silica fume, fly ash, perlite powder and glass powder.

Recently, it has been said that, among silica, crystalline silica such as quartz, tridymite and cristobalite has a possibility to adversely affect human body similarly as asbestos does.

A major part of the silica component contained in blast furnace slag is amorphous, and thus use of blast furnace slag is not accompanied by worry about health issue.

It is preferable that the blast furnace slag contains not less than 20% by mass and not more than 40% by mass of $SiO_2$ component.

A major part of the silica component contained in silica fume is amorphous. Although silica fume contains a very small amount of cristobalite, silica fume has a high Blaine value and a high activity, and thus crystalline silica disappears via a hydrothermal reaction.

Incidentally, Blaine value shows fineness of powder and refers to a specific area measured by Blaine method.

It is preferable that the silica fume contains not less than 97% by mass of $SiO_2$ component.

Fly ash contains some amount of crystalline silica depending on the type (about 10% by mass of quartz). However, by finely dividing fly ash to not larger than 15 μm in particle size, the reaction activity thereof is increased and thus almost part of the crystalline silica contained in fly ash is converted to calcium silicate hydrates via curing in an autoclave and the crystalline silica almost disappears.

In addition, by finely dividing fly ash to not larger than 15 μm in particle size, the reaction activity is increased, thereby contributing to enhancement of bending strength.

It is preferable that the fly ash contains not less than 50% by mass and not more than 70% by mass of $SiO_2$ component.

Glass powder is glassy and the content of silica largely varies depending on the type. By using a kind of glass powder having a high silica content, an aimed performance of the resulting base material can be obtained.

Perlite powder is composed mainly of glassy substances and the silicate content thereof is as high as about 80% by mass. If it is divided for use, an aimed performance of the resulting base material can be obtained.

Both glass powder and perlite powder are amorphous and thus do not provide health issue.

Siliceous lightweight substances such as expanded perlite and shirasu balloons may be used as the siliceous material.

It is possible to judge whether or not silica is crystalline by the appearance of the crystalline peaks of the crystalline silica such as quartz, tridymite or cristobalite in an X-ray diffraction.

Namely, quartz or the like is crystalline and thus if the peaks of quartz or the like are observed in a siliceous material, the silica component contained in the siliceous material is crystalline rather than amorphous.

Accordingly, such a siliceous material in which the peaks observed in quartz or the like in an X-ray diffraction are not observed is used in the present invention.

When fly ash is used as the siliceous material, it is very inexpensive and thus economical and, in addition, the resulting fiber reinforced cement board is excellent in nail performance because the shape of fly ash is spherical. However, fly ash has a specific gravity lower than that of silica sand and thus the resulting board inevitably has a low specific gravity.

Thus, by replacing a part of the fly ash component with silica fume, specifically, replacing not less than 3% by mass and not more than 7% by mass of fly ash with silica fume, it is possible to obtain a fiber reinforced cement board having a high strength, good flexibility performance and good nail performance without largely increasing the cost and without lowering the specific gravity of the board.

In addition, by using fly ash which has been finely divided into a particle size of not more than 15 μm in combination with silica fume, it is possible to set the cost, specific gravity and bending strength of the resulting board to predetermined values.

Also in the case where blast furnace slag is used as the siliceous material, a fiber reinforced cement board having a high strength and good flexibility performance can be obtained by replacing not less than 5% by mass and not more than 20% by mass of the blast furnace slag with silica fume.

The reason why the replacement ratio of blast furnace slag with silica fume is larger than that of fly ash is that the $SiO_2$ component contained in blast furnace slag is less than that contained in fly ash.

Blast furnace slag and fly ash may be used in combination as the siliceous material.

In this case, not less than 30% by mass and not more than 70% by mass of the blast furnace slag is optionally replaced with fly ash in compliance with a desired specific gravity of the resulting board.

Table 2

Table 2 shows an example of the analytical value of the chemical composition of each of the silica fume, fly ash and blast furnace slag used in the present invention.

[Mica]

Mica contributes to improvement in the dimensional stability of a product since it usually has a lamellar structure, is not hygroscopic and is a high elastic substance having a rigidity.

For example, if a fiber reinforced cement board without mica contains 15 to 18% by mass of water at the time when it is sold, the size of the board tends to shrink as the water content thereof decreases upon natural evaporation of the water under environmental conditions. However, if a fiber reinforced cement board contains mica, the dimension thereof does not largely change.

The mica used in the present invention is preferably in the form of flakes having an average particle size of not less than 200 μm and not more than 700 μm, and an aspect ratio of not less than 60 and not more than 100.

Incidentally, the aspect ratio herein means the ratio of thickness relative to particle size.

[Water-Soluble Resin]

Examples of the water-soluble resin include polyvinyl alcohols, carboxymethyl cellulose, methyl cellulose, polyethylene oxides and polyvinyl ethers.

The water-soluble resin serves as a binder in the fiber reinforced cement board, enhances adhesion among the layers of the components contained in the board, and improves the bending strength, as well as freezing and fusion resistance of the board.

In addition, since the water-soluble resin has a water-retention action, it prevents the surface of the fiber reinforced cement board from drying in the course of autoclave curing and acts to uniform the water content, thereby achieving a uniform hardening-curing reaction.

A desirable water-soluble resin is a powdery polyvinyl alcohol resin having a saponification value of not less than 98% by mol.

Incidentally, the term "saponification value" means a percentage of the number of hydroxyl group relative to the total number of acetate group and hydroxyl group contained in a polyvinyl alcohol resin through a saponification reaction (a reaction to synthesize a polyvinyl alcohol resin by replacing the acetate group in a polyvinyl acetate with hydroxyl group).

A powdery polyvinyl alcohol resin having a saponification value of not less than 98% by mol is not soluble in water but merely swells at a normal temperature, and thus does not dissolve in the water in an aqueous slurry of raw materials at a normal temperature. Therefore, in the after-mentioned forming process, outflow of the polyvinyl alcohol resin is reduced, whereby the process yield does not decrease, and the viscosity of the slurry is not raised, whereby the forming efficacy does not decrease.

In the green sheet prepared by forming the slurry of raw materials, the powdery polyvinyl alcohol resin comes to dissolve in the water contained in the green sheet owing to the high temperature in an autoclave curing process. Because the water content of the green sheet is low, a major part of the powdery polyvinyl alcohol resin remains in the green sheet in a balloon state in which the powdery polyvinyl alcohol resin is dissolved in water and a large amount of the polyvinyl alcohol resin in the balloon state exists in a final product, i.e. a fiber reinforced cement board. Thus the product is provided with a cushioning property due to the effect of the shape of the balloon itself, whereby the internal stress which generates during freezing and fusion is absorbed and released to enhance freezing and fusion resistance.

In addition, when a water-soluble resin is added, the water-soluble resin coats the surface of the particles of cement as a protecting colloid, which possibly affects the hydration reaction of the cement. However, when a powdery polyvinyl alcohol resin is used, a major part of the resin remains in a balloon state in the green sheet. Thus it becomes difficult to coat the cement particles with the polyvinyl alcohol resin as a protecting colloid, whereby the effect of the resin on the hydration reaction of the cement is reduced.

[Other Component]

As the other components, the following components may be optionally added: mineral powders such as vermiculite, bentonite and dolomite; inorganic fibers such as wollastonite and glass fiber; organic fibers such as polypropylene fiber, acryl fiber and aramid fiber; cement setting accelerators such as sodium aluminate, calcium formate, potassium sulfate, calcium sulfate, aluminum sulfate and calcium acetate; water-repellants or water-proofing agents such as wax, paraffin, silicone and surfactants; and pulverized waste materials such as pulverized woody cement boards and inorganic boards.

Incidentally, these illustrations do not restrict the present invention.

Next, the composition of the raw materials of the above-mentioned fiber reinforced cement board is explained.

[Raw Material Composition of the Fiber Reinforced Cement Board]

The fiber reinforced cement board is preferably composed of the following raw materials: not less than 25% by mass and not more than 45% by mass of a hydraulic inorganic material, not less than 50% by mass and not more than 65% by mass of an amorphous siliceous material, not less than 5% by mass and not more than 12% by mass of a woody reinforcement, not less than 1% by mass and not more than 7% by mass of mica, and not less than 0.25% by mass and not more than 1.5% by mass of a water-soluble resin.

If the amount of the hydraulic inorganic material is less than 25% by mass, development of the strength after first hardening is not sufficient, whereas if it is more than 45% by mass, the resulting fiber reinforced cement board becomes rigid and fragile.

If the amount of the amorphous siliceous material is less than 50% by mass, a silica component which reacts in a calcium silicate reaction is not enough, whereas if it is more than 65% by mass, a calcium component is not enough to leave an unreacted silica component.

If the amount of the woody reinforcement is less than 5% by mass, a problem with regard to toughness of the resulting fiber reinforced cement board occurs, whereas if it is more than 12% by mass, uniform dispersion thereof in the raw materials becomes difficult.

If the amount of mica is less than 1% by mass, it does not contribute to the dimensional stability of the resulting fiber reinforced cement board, whereas if it is more than 7% by mass, uniform dispersion thereof in the raw materials becomes difficult.

If the amount of the water-soluble resin is less than 0.25% by mass, it does not contribute to the development of strength, whereas if it is more than 1.5% by mass, improvement in the physical properties of the resulting board is not achieved.

A ratio of CaO to $SiO_2$ ($CaO:SiO_2$) in the raw materials of the hydraulic material and the amorphous siliceous material which is effective for the reaction between the hydraulic inorganic material and the amorphous siliceous material, particularly for developing strength via a cement hydration reaction and a calcium silicate reaction, is in the following range; $CaO:SiO_2$=23:77 to 60:40 by mass.

It is possible to realize the mass ratio of $CaO:SiO_2$=23:77 to 60:40 by analyzing the chemical composition each of the hydraulic inorganic material and the amorphous siliceous material.

For example, if the ordinary portland cement shown in Table 1 ($SiO_2$:20.5% by mass, $Al_2O_3$:4.3% by mass, $Fe_2O_3$:2.7% by mass, CaO:63.7% by mass, MgO:2.6% by mass, $SO_3$:2.8% by mass) is used as the hydraulic inorganic material in an amount of 30% by mass of the whole solid content, and, as the siliceous material, the silica fume shown in Table 2 ($SiO_2$:98.0% by mass, $Al_2O_3$:0.23% by mass, $Fe_2O_3$:0.62% by mass, CaO:0.07% by mass, MgO:0.36% by mass, $SO_3$:0.09% by mass) is used in an amount of 3% by mass of the whole solid content and the fly ash shown in Table 2 ($SiO_2$:56.8% by mass, $Al_2O_3$:28.5% by mass, $Fe_2O_3$:7.3% by mass, CaO:1.4% by mass, MgO:0.96% by mass, $SO_3$:0.46% by mass) is used in an amount of 53% by mass of the whole solid content, the content of CaO is calculated to be 19.854 (30×0.637+3×0.0007+53×0.014=19.854) and the content of $SiO_2$ is calculated to be 39.314 (30×0.205+3×0.98+53×0.568=39.314), whereby the ratio $CaO:SiO_2$ is 19.854:39.314≈(nearly equal to)34:66.

As another example, if the ordinary portland cement shown in Table 1 ($SiO_2$:20.5% by mass, $Al_2O_3$:4.3% by mass, $Fe_2O_3$:2.7% by mass, CaO:63.7% by mass, MgO:2.6% by mass, $SO_3$:2.8% by mass) is used as the hydraulic inorganic material in an amount of 30% by mass of the whole solid content, and, as the siliceous material, the fly ash shown in Table 2 ($SiO_2$:56.8% by mass, $Al_2O_3$:28.5% by mass, $Fe_2O_3$:7.3% by mass, CaO:1.4% by mass, MgO:0.96% by mass, $SO_3$:0.46% by mass) is used in an amount of 28.0% by mass of the whole solid content and the blast furnace slag shown in Table 2 ($SiO_2$:33.1% by mass, $Al_2O_3$:13.7% by mass, $Fe_2O_3$:0.23% by mass, CaO:43.0% by mass, MgO:5.5% by mass, $SO_3$:2.0% by mass) is used in an amount of 28.0% by mass of the whole solid content, the content of CaO is calculated to be 31.542 (30×0.637+28×0.014+28×0.43=31.542) and the content of $SiO_2$ is calculated to be 31.322 (30×0.205+28×0.568+28×0.331=31.322), whereby the mass ratio $CaO:SiO_2$ is 31.542:31.332≈(nearly equal to) 50:50.

A preferable mass ratio is obtained by using as the hydraulic inorganic material not less than 28% by mass and not more than 32% by mass of the portland cement, and as the siliceous material not less than 54% by mass and not more than 58% by mass in total of fly ash and silica fume, wherein the amount of the silica fume is not less than 3% by mass and not more than 7% by mass of the whole siliceous material consisting of the fly ash and the silica fume. In this case, the mass ratio $CaO:SiO_2$ is in a range of from 30:70 to 40:60.

Another preferable mass ratio is obtained by using as the hydraulic inorganic material not less than 28% by mass and not more than 32% by mass of the portland cement, and as the siliceous material not less than 54% by mass and not more than 58% by mass in total of the blast furnace slag and the silica fume, wherein the amount of the silica fume is not less than 5% by mass and not more than 20% by mass of the whole siliceous material consisting of the blast furnace slag and the silica fume. In this case, the mass ratio $CaO:SiO_2$ is in a range of from 50:50 to 60:40.

Another preferable mass ratio is obtained by using as the hydraulic inorganic material not less than 28% by mass and not more than 32% by mass of the portland cement, and as the siliceous material not less than 54% by mass and not more than 58% by mass in total of the fly ash and the blast furnace slag, wherein the amount of the fly ash is not less than 30% by mass and not more than 70% by mass of the whole siliceous material consisting of the fly ash and the blast furnace slag. In this case, the mass ratio $CaO:SiO_2$ is in a range of from 40:60 to 60:40.

A process for manufacturing a fiber reinforced cement board is explained below.

[Manufacturing Process]

At first, the above-mentioned raw materials are mixed with water to give a slurry of raw materials.

The concentration of the slurry is in a range of from 3 to 15% by mass reduced to a concentration of solid content.

It is desirable to add silica fume in the form of slurry obtained by mixing it with water with stirring rather than in the form of powder, and the slurry having a concentration of approximately 30% by mass is most readily handled.

The slurry of raw materials is subjected to a wet manufacturing process.

Examples of the wet manufacturing processes include Hatschek process, flow on process, filter pressing process, roll forming, extrusion, injection, Mazza pipe process, Magnani sheet process, hand lay-up process, molding and casting. Flow on process is employed for forming herein.

The "flow on process" is a process in which a slurry of raw materials is flown down on an endless felt provided with a suction unit below the felt and formed with suction-dehydration to give a green sheet (i.e. a soft wet sheet), and the green sheet is rolled up around a making roll to give a multi-layer sheet, and when the thickness of the multi-layer sheet reaches a predetermined thickness, the sheet is removed from the making roll to give a green mat.

The number of rolling around the making roll is preferably 6 to 15.

Then, the green mat is pressed with a pressure of 2 to 5 MPa.

Incidentally, the green sheet is rolled up around the making roll in layers also in Hatschek process like in flow-on process. In the Hatschek process, forming speed is high, and as the speed increases, the fibers are more readily orientated and the aspect ratio (length/breadth ratio) of the bending strength increases. On the other hand, in the flow on process in which raw materials are flown down on the felt, fibers are not so readily orientated as in the Hatschek process, and thus the aspect ratio of the bending strength is not so increased as in the Hatschek process.

The "Hatschek process" is a process in which plural butts each accommodating a suction cylinder are provided, a slurry of raw materials is placed in the butts, and an endless felt is run on the cylinders in the butts to transfer the slurry of raw materials to the felt to give a green sheet.

When the aspect ratio (length/breadth ratio) of the bending strength is too large, problems are raised in that the resulting fiber reinforced cement board is resistant to a load applied from one direction (a direction vertical to the direction that the fibers are orientated) but is not resistant to a load from the other direction (a direction parallel to the direction that the fibers are orientated).

Since a fiber reinforced cement board is usually cut in parallel to the forming direction and across the longitudinal direction (machine direction) of the board, it seems that there is no problem. However, since a long fiber reinforced cement board is transferred by holding the center of the board by one man or by holding the both ends of the board by two men, sometimes the board suddenly fractures when a load larger than a certain value is applied to the board unless the board sags to some degree.

In this respect, the aspect ratio of the bending strength is not so increased in the product of the flow on process as in the product of the Hatschek process, and thus the product of the flow on process sags by the application of a certain load to release the stress.

In addition, since plural butts each accommodating a cylinder are provided and a felt is run on the cylinders in the butts to transfer the slurry of raw materials to the felt in the Hatschek process, the green sheet which has been formed and dehydrated on the felt and rolled up around the making roll produces a laminar structure having the number of layers equivalent to the number of the butts.

On the contrary, when the flow-on process is employed, the resulting green sheet itself is not laminar but is rolled up around the making roll to give a laminar structure having the number of layers equivalent to the number of rolling up around the making roll, and thus the resulting sheet has a freezing and fusion resistance better than that of the green sheet obtained by the Hatschek process.

Furthermore, in the Hatschek process, a felt is run on the cylinders in the butts to transfer the slurry of raw materials to the felt, and thus it is necessary to increase the number of the butt to increase the thickness of the resulting fiber reinforced cement board. This is very uneconomical. On the other hand, in the flow on process, since the thickness of the board can be increased readily by increasing the amount of the slurry of raw materials to be flown down on the felt, the flow on process is economical. In addition, the bulk of the board can be increased prior to pressing in this process, whereby deep embosses can be formed on the green mat.

Therefore, it is preferable to adopt the flow-on process.

Subsequently, the press-molded mat obtained by pressing the green mat is hardened at 40 to 80° C. for 12 to 24 hours and then cured in an autoclave.

Curing in an autoclave is preferably effected by raising the temperature to 150 to 180° C. in 3.5 hours, keeping the temperature for 6.5 hours and lowering the temperature in 6 hours.

Upon autoclave curing under such conditions, a silica component and an alumina component elute from the surface of mica, thereby roughening the surface of mica.

In addition, the calcium component eluted from cement or the like is liable to enter into the space among overlapped parts of mica fragments, and the calcium component reacts with the silica component and some amount of the alumina component both eluted from the surface of mica to produce a stable calcium silicate hydrate in the space among the overlapped parts of mica fragments, thereby firmly adhering the mica fragments.

During the autoclave curing, a kind of tobermorite having a card house structure and having a better crystalline property than that of the other kind of tobermorite is produced in a large amount, whereby the dimensional stability, as well as the freezing and fusion resistance of the board are enhanced.

If the amount of the calcium component is too much relative to the amount of the silica component, a cement hydration predominantly occurs rather than a calcium silicate reaction, whereby the resulting fiber reinforced cement board becomes fragile and the crack resistance thereof decreases.

On the contrary, if the amount of the silica component is too much relative to the amount of the calcium component, unreacted silica component remains in a large amount and production of tobermorite decreases, whereby the freezing and fusion resistance of the board decreases.

A trace amount of crystalline silica contained in silica fume and fly ash is converted to calcium silicate hydrates via a reaction caused by autoclave curing, and thus the crystalline silica almost disappears.

Application forms of the fiber reinforced cement board include fiber reinforced cement sidings, glass fiber reinforced cement boards, pulp reinforced cement boards, wood fiber reinforced cement calcium silicate boards, fiber reinforced cement calcium silicate boards, slag cement perlite boards and the like.

[Coating Method]

Coating of the fiber reinforced cement board is effected, for example, by coating with a sealer the front face twice and the ends and the rear face once, applying an undercoating such as an aqueous emulsion type acryl resin paint or a silicone resin paint, applying an intermediate coating, and then applying a top coating such as an organic solvent solution type acryl resin paint, an aqueous emulsion type acryl resin paint or an organic solvent solution type silicone acryl resin paint.

[Installation Method]

As a method for installation of the fiber reinforced cement board, it is preferable to effect, for example, in the case of fiber reinforced cement sidings, by nailing a first siding at the positions about 20 mm inside from or below the upper edge thereof, placing a second siding on the first siding in such a manner that the lower edge of the second siding overlaps the upper edge of the first siding by not less than 30 mm, and then nailing the second siding at the positions about 20 mm inside from the upper edge thereof according to a so-called lap boarding.

DESCRIPTION OF THE PREFERRED EMBODIMENTS

Embodiment 1

An example of the present invention will be illustrated by Embodiment 1.

Table 3

Table 3 shows the compositions of the raw materials used in Examples 1-10 according to the present invention.

The raw materials having the composition shown in the table are mixed, and water is added thereto to give a slurry of raw materials having a solid concentration of 10% by mass. The slurry is caused to flow down on a felt and formed with dehydration to give a green sheet. The green sheet is rolled up around a making roll to give a multilayer structure. When the thickness of the sheet reaches a predetermined value, the sheet is separated from the making roll to give a green mat. The mat is pressed with a pressure of 5 MPa, hardened and cured at 80° C. for 15 hours, and further cured in an autoclave at 170° C. for 7 hours to provide a fiber reinforced cement board.

Table 4

Table 4 shows physical properties of the boards of Examples 1-10 according to the present invention.

As shown in FIG. 1, handling test was effected by placing a test piece of 8 mm in thickness, 210 mm in width and 3600 mm in length on two supporting legs arranged with a span of 2300 mm and held at 900 mm in height.

The test piece protrudes outwardly from each of the two supporting legs by 650 mm.

The both sides of the central part of the test piece corresponding to the center of the span of the supporting legs were held horizontally by hands, a load of 1 kg was applied to the central part of the test piece, and then the handhold was gently released to allow the test piece to sag.

Thereafter, when swinging of the sagging test piece ceased, the test piece applied with the load was returned to the horizontal location at the top of the supporting legs by holding the both sides of the test piece by hands, and the handhold was gently released again to allow the test piece to sag. By these procedures, the test piece sagged two times.

After the above-mentioned procedures were repeated to allow the test piece to sag 50 times, the distance between the height of the horizontal location at the top of the supporting legs and the height of the central part of the sagging test piece was measured and was used as a flexible quantity.

Bending strength and young's modulus were measured using a test piece of 70×200 mm (according to JIS A 1408).

Elongation ratio through water absorption is an elongation ratio of a test piece before and after absorption of water caused by air conditioning the test piece at 60° C. for 3 days and then immersing it in water for 8 days to allow absorption of water.

Contraction ratio through moisture effusion is a contraction ratio of a test piece before and after moisture effusion caused by air conditioning the piece at 20° C. under RH of 60% for 10 days and then drying it at 80° C. for 10 days to allow moisture effusion.

Microcracking test (cycle) means the number of a cycle repeated until cracks generate, wherein one cycle consists of a water absorption-drying procedure repeated 3 times in one week, said water absorption-drying procedure consisting of neutralization for 4 days, water absorption for 7 hours and drying at 120° C. for 17 hours.

Freezing and fusion resistance is a percentage of expansion in thickness after conducting 300 cycles according to ASTM C166-B method.

Nailing performance is determined by observing generation of cracks when two fiber reinforced cement boards which are laid to overlap with each other by 30 mm are pegged with nails of 2.3 mm in diameter and 38 mm in length by means of a nailer gun at the points of the overlapped part of the boards 20 mm inside from the edges of the overlapped part in the longitudinal direction and in the shorter direction in compliance with actual installation. The mark "○" denotes no cracking and the mark "×" denotes generation of cracks.

Presence or absence of crystalline silica was judged from appearance of the peaks observed in crystalline silica such as quartz, tridymite, or cristobalite in an X-ray diffraction.

EXAMPLE 1

The fiber reinforced cement board of Example 1 having an absolute dry specific gravity of 1.30 and a flexible quantity according to the handling test of 150 mm is excellent in installation properties such as nail performance and is also excellent in various physical properties such as bending strength, elongation ratio through water absorption, contraction ratio through moisture effusion, freezing and fusion resistance, and microcracking test.

EXAMPLE 2

The fiber reinforced cement board of Example 2 having an absolute dry specific gravity of 1.20 and a flexible quantity according to the handling test of 310 mm is excellent in installation properties such as nail performance and is also excellent in various physical properties such as bending strength, elongation ratio through water absorption, contraction ratio through moisture effusion, freezing and fusion resistance, and microcracking test.

EXAMPLE 3

The fiber reinforced cement board of Example 3 having an absolute dry specific gravity of 1.25 and a flexible quantity according to the handling test of 255 mm is excellent in installation properties such as nail performance and is also excellent in various physical properties such as bending strength, elongation ratio through water absorption, contraction ratio through moisture effusion, freezing and fusion resistance, and microcracking test.

EXAMPLE 4

The fiber reinforced cement board of Example 4 having an absolute dry specific gravity of 1.25 and a flexible quantity according to the handling test of 230 mm is excellent in installation properties such as nail performance and is also excellent in various physical properties such as bending strength, elongation ratio through water absorption, contraction ratio through moisture effusion, freezing and fusion resistance, and microcracking test.

EXAMPLE 5

The fiber reinforced cement board of Example 5 having an absolute dry specific gravity of 1.25 and a flexible quantity according to the handling test of 210 mm is excellent in installation properties such as nail performance and is also excellent in various physical properties such as bending strength, elongation ratio through water absorption, contraction ratio through moisture effusion, freezing and fusion resistance, and microcracking test.

EXAMPLE 6

The fiber reinforced cement board of Example 6 having an absolute dry specific gravity of 1.23 and a flexible quantity according to the handling test of 240 mm is excellent in installation properties such as nail performance and is also excellent in various physical properties such as bending strength, elongation ratio through water absorption, contraction ratio through moisture effusion, freezing and fusion resistance, and microcracking test.

EXAMPLE 7

The fiber reinforced cement board of Example 7 having an absolute dry specific gravity of 1.21 and a flexible quantity according to the handling test of 250 mm is excellent in installation properties such as nail performance and is also excellent in various physical properties such as bending strength, elongation ratio through water absorption, contraction ratio through moisture effusion, freezing and fusion resistance, and microcracking test.

EXAMPLE 8

The fiber reinforced cement board of Example 8 having an absolute dry specific gravity of 1.26 and a flexible quantity according to the handling test of 195 mm is excellent in installation properties such as nail performance and is also excellent in various physical properties such as bending strength, elongation ratio through water absorption, contraction ratio through moisture effusion, freezing and fusion resistance, and microcracking test.

EXAMPLE 9

The fiber reinforced cement board of Example 9 having an absolute dry specific gravity of 1.24 and a flexible quantity according to the handling test of 215 mm is excellent in installation properties such as nail performance and is also excellent in various physical properties such as bending strength, elongation ratio through water absorption, contraction ratio through moisture effusion, freezing and fusion resistance, and microcracking test.

EXAMPLE 10

The fiber reinforced cement board of Example 10 having an absolute dry specific gravity of 1.22 and a flexible quantity according to the handling test of 305 mm is excellent in installation properties such as nail performance and is also excellent in various physical properties such as bending strength, elongation ratio through water absorption, contraction ratio through moisture effusion, freezing and fusion resistance, and microcracking test.

Embodiment 2

Comparisons for the present invention are illustrated as Embodiment 2.

Table 5

Table 5 shows the compositions of the raw materials of the fiber reinforced cement boards of Comparisons 1 to 8 in which the fiber reinforced cement boards were manufactured by a process similar to that in the examples.

Table 6

Table 6 shows various physical properties of the fiber reinforced cement boards of Comparisons 1 to 8 in which the fiber reinforced cement boards were measured in a manner similar to that in the examples.

Comparison 1

The fiber reinforced cement board of Comparison 1 which has an absolute dry specific gravity of 1.26 and has broken in the handling test is excellent in installation properties such as nail performance but has a low bending strength and poor freezing and fusion resistance.

Comparison 2

The fiber reinforced cement board of Comparison 2 which has an absolute dry specific gravity of 1.55 and has broken in the handling test has poor installation properties such as nail performance and has a low value in the microcracking test.

Comparison 3

The fiber reinforced cement board of Comparison 3 which has an absolute dry specific gravity of 1.38 and has broken in the handling test has poor installation properties such as nail performance and has a low value in the microcracking test.

Comparison 4

The fiber reinforced cement board of Comparison 4 which has an absolute dry specific gravity of 1.17 and has broken in the handling test is excellent in installation properties such as nail performance but has a low bending strength and poor freezing and fusion resistance.

Comparison 5

The fiber reinforced cement board of Comparison 5 which has an absolute dry specific gravity of 0.97 and a flexible quantity in the handling test of 750 mm is excellent in installation properties such as nail performance but has a low bending strength and a poor elongation ratio through water absorption, contraction ratio through moisture effusion, and freezing and fusion resistance.

Comparison 6

The fiber reinforced cement board of Comparison 6 which has an absolute dry specific gravity of 1.70 and has broken in the handling test has poor installation properties such as nail performance and has a low bending strength and a low value in the microcracking test.

Comparison 7

The fiber reinforced cement board of Comparison 7 which has an absolute dry specific gravity of 1.11 and a flexible quantity in the handling test of 700 mm is excellent in installation properties such as nail performance but has a low bending strength and a poor freezing and fusion resistance.

Comparison 8

The fiber reinforced cement board of Comparison 8 which has an absolute dry specific gravity of 1.07 and a flexible quantity in the handling test of 700 mm is excellent in installation properties such as nail performance but has a low bending strength and a poor freezing and fusion resistance.

TABLE 1

[LABORATORY TEST REPORT FOR PORTLAND CEMENT]

| | | Specification |
|---|---|---|
| Chemical Tests | | |
| $SiO_2$ | 20.5(%) | |
| $Al_2O_3$ | 4.3 | 6.0 Max. |
| $Fe_2O_3$ | 2.7 | 6.0 Max. |
| CaO | 63.7 | |
| MgO | 2.6 | 6.0 Max. |
| $SO_3$ | 2.8 | 3.0 Max. |
| LOI | 1.6 | 3.0 Max. |
| $Na_2O$ | 0.27 | |
| $K_2O$ | 0.68 | |
| $Na_2O$ eq. | 0.71 | |
| Ins. Res. | 0.23 | 0.75 Max. |
| $C_3S$ | 63 (%) | |
| $C_2S$ | 11 | |
| $C_3A$ | 7 | |
| $C_4AF$ | 8 | |
| Physical Tests | | |
| Specific Gravity | 3.15 | |
| Compressive Strengths - (psi) | | |
| 1 Day | 2590 | |
| 3 Day | 4030 | |
| 7 Day | 4910 | |
| 28 Day | 5990 | |

TABLE 1-continued

[LABORATORY TEST REPORT FOR PORTLAND CEMENT]

| | | Specification |
|---|---|---|
| Setting Time (Vicat) - (mins) | | |
| Initial | 141 | 60 Min. |
| Final | 246 | 600 Max. |
| False Set | 81% | 50 Min. |
| Blaine | 379 | 280 Min. |
| % 325 Mesh | 96 | |
| % Expansion | −0.01 | 0.80 Max. |
| % Air | 8 | 12 Max. |

TABLE 2

[CHEMICAL TEST REPORT FOR FLYASH, BLAST FURNACE SLAG, SILICA FUME]

| Fly ash | | | Blast furnace slag | | | Silica fume | | |
|---|---|---|---|---|---|---|---|---|
| $SiO_2$ | 56.8 | (%) | $SiO_2$ | 33.1 | (%) | $SiO_2$ | 98.0 | (%) |
| $Al_2O_3$ | 28.5 | | $Al_2O_3$ | 13.7 | | $Al_2O_3$ | 0.23 | |
| $Fe_2O_3$ | 7.3 | | $Fe_2O_3$ | 0.23 | | $Fe_2O_3$ | 0.62 | |
| CaO | 1.4 | | CaO | 43.0 | | CaO | 0.07 | |
| MgO | 0.96 | | MgO | 5.5 | | MgO | 0.34 | |
| $SO_3$ | 0.46 | | $SO_3$ | 2.0 | | $SO_3$ | 0.09 | |
| $Na_2O$ | 0.36 | | $Na_2O$ | | | $Na_2O$ | 0.22 | |
| $K_2O$ | 2.4 | | $K_2O$ | | | $K_2O$ | 0.37 | |
| LOI | 2.6 | | LOI | 0.89 | | LOI | 1.1 | |

TABLE 3

| Raw material composition (% by mass) | Example 1 | Example 2 | Example 3 | Example 4 | Example 5 | Example 6 | Example 7 | Example 8 | Example 9 | Example 10 |
|---|---|---|---|---|---|---|---|---|---|---|
| Portland cement | 30 | 30 | 30 | 30 | 30 | 30 | 30 | 30 | 30 | 28 |
| Blast furnace slag | 0 | 0 | 0 | 46 | 0 | 0 | 28 | 20 | 12 | 54 |
| Fly ash | 11 | 50 | 0 | 0 | 0 | 0 | 28 | 31 | 39 | 0 |
| Finely dividing fly ash | 0 | 0 | 53 | 0 | 0 | 0 | 0 | 0 | 0 | 0 |
| Silica fume | 45 | 6 | 3 | 10 | 3 | 3 | 0 | 5 | 5 | 4 |
| Perlite powder | 0 | 0 | 0 | 0 | 53 | 0 | 0 | 0 | 0 | 0 |
| Glass powder | 0 | 0 | 0 | 0 | 0 | 53 | 0 | 0 | 0 | 0 |
| NUKP | 8 | 0 | 0 | 4 | 8 | 8 | 8 | 8 | 8 | 8 |
| NBKP | 0 | 8 | 8 | 4 | 0 | 0 | 0 | 0 | 0 | 0 |
| Used newspaper | 2 | 2 | 2 | 2 | 2 | 2 | 2 | 2 | 2 | 2 |
| Mica | 3 | 3 | 3 | 3 | 3 | 3 | 3 | 3 | 3 | 3 |
| Polyvinyl alcohol resin | 1 | 1 | 1 | 1 | 1 | 1 | 1 | 1 | 1 | 1 |

TABLE 4

| Physical property | Example 1 | Example 2 | Example 3 | Example 4 | Example 5 | Example 6 | Example 7 | Example 8 | Example 9 | Example 10 |
|---|---|---|---|---|---|---|---|---|---|---|
| Absolute dry specific gravity | 1.30 | 1.20 | 1.25 | 1.25 | 1.25 | 1.23 | 1.21 | 1.26 | 1.24 | 1.22 |
| Handling test flexible quantity (mm) | 150 | 310 | 255 | 230 | 210 | 240 | 250 | 195 | 215 | 305 |
| Bending strength ($N/mm^2$) | 28.5 | 19.1 | 20.2 | 21.2 | 21.5 | 20.8 | 20.3 | 22.4 | 21.2 | 19.5 |
| Young's modulus ($kN/mm^2$) | 8.9 | 8.2 | 6.5 | 7.3 | 6.9 | 6.6 | 6.4 | 7.6 | 6.8 | 6.2 |
| Bending test flexible quantity (mm) | 3.0 | 3.1 | 3.4 | 3.2 | 3.4 | 3.5 | 3.6 | 3.1 | 3.4 | 3.5 |
| Elongation ratio through water absorption (%) | 0.11 | 0.15 | 0.14 | 0.15 | 0.14 | 0.15 | 0.14 | 0.13 | 0.15 | 0.14 |
| Contraction ratio through moisture effusion (%) | 0.12 | 0.17 | 0.16 | 0.14 | 0.14 | 0.15 | 0.15 | 0.14 | 0.14 | 0.14 |
| Microcracking test (cycle) | 7 | 6 | 6 | 7 | 7 | 7 | 7 | 6 | 7 | 8 |
| Freezing and fusion resistance (%) | 0.3 | 0.8 | 0.7 | 0.5 | 0.6 | 0.7 | 0.7 | 0.4 | 0.6 | 0.8 |
| Nail performance | ○ | ○ | ○ | ○ | ○ | ○ | ○ | ○ | ○ | ○ |
| Presence or absence of crystalline silica | Not present | Scarcely present | Scarcely present | Not present | Not present | Not present | Scarcely present | Scarcely present | Scarcely present | Not present |

TABLE 5

| Raw material composition (% by mass) | Comparison 1 | Comparison 2 | Comparison 3 | Comparison 4 | Comparison 5 | Comparison 6 | Comparison 7 | Comparison 8 |
|---|---|---|---|---|---|---|---|---|
| Portland cement | 10 | 55 | 46 | 11 | 28 | 32 | 30 | 30 |
| Silica sand | 0 | 28 | 40 | 75 | 0 | 0 | 46 | 47 |
| Blast furnace slag | 68 | 0 | 0 | 0 | 0 | 0 | 0 | 0 |
| Fly ash | 0 | 0 | 0 | 0 | 47 | 55 | 0 | 0 |
| Silica fume | 8 | 3 | 0 | 0 | 3 | 5 | 3 | 5 |
| Perlite powder | 0 | 0 | 0 | 0 | 0 | 0 | 0 | 0 |
| Glass powder | 0 | 0 | 0 | 0 | 0 | 0 | 0 | 0 |
| NUKP | 8 | 8 | 8 | 8 | 8 | 0 | 8 | 8 |
| NBKP | 0 | 0 | 0 | 0 | 8 | 4 | 0 | 0 |
| Used newspaper | 2 | 2 | 2 | 2 | 2 | 0 | 2 | 2 |

TABLE 5-continued

| Raw material composition (% by mass) | Comparison 1 | Comparison 2 | Comparison 3 | Comparison 4 | Comparison 5 | Comparison 6 | Comparison 7 | Comparison 8 |
|---|---|---|---|---|---|---|---|---|
| Mica | 3 | 3 | 3 | 3 | 3 | 3 | 10 | 3 |
| Polyvinyl alcohol resin | 1 | 1 | 1 | 1 | 1 | 1 | 1 | 5 |

TABLE 6

| Physical property | Comparison 1 | Comparison 2 | Comparison 3 | Comparison 4 | Comparison 5 | Comparison 6 | Comparison 7 | Comparison 8 |
|---|---|---|---|---|---|---|---|---|
| Absolute dry specific gravity | 1.26 | 1.55 | 1.38 | 1.17 | 0.97 | 1.70 | 1.11 | 1.07 |
| Handling test flexible quantity (mm) | Breaking | Breaking | Breaking | Breaking | 750 | Breaking | 700 | 700 |
| Bending strength (N/mm$^2$) | 12.1 | 16.8 | 19.1 | 11.9 | 12.0 | 13.2 | 12.3 | 12.1 |
| Young's modulus (kN/mm$^2$) | 5.6 | 9.3 | 8.2 | 5.8 | 3.9 | 11.5 | 4.5 | 4.2 |
| Bending test flexible quantity (mm) | 2.6 | 2.3 | 2.6 | 2.5 | 5.3 | 1.8 | 4.4 | 4.7 |
| Elongation ratio through water absorption (%) | 0.15 | 0.15 | 0.16 | 0.15 | 0.26 | 0.10 | 0.14 | 0.15 |
| Contraction ratio through moisture effusion (%) | 0.15 | 0.17 | 0.17 | 0.15 | 0.31 | 0.11 | 0.13 | 0.14 |
| Microcracking test (cycle) | 6 | 1 | 2 | 6 | 7 | 1 | 8 | 8 |
| Freezing and fusion resistance (%) | 5.9 | 0.3 | 0.5 | 6.3 | 9.5 | 0.2 | 5.5 | 4.1 |
| Nail performance | ○ | x | x | ○ | ○ | x | ○ | ○ |
| Presence or absence of crystalline silica | Not present | present | present | present | Scarcely present | Scarcely present | present | present |

What is claimed is:

1. A fiber reinforced cement board having an absolute dry specific gravity of not less than 1.20 and not more than 1.30 and comprising the following raw materials:
   not less than 28% by mass and not more than 32% by mass of a hydraulic portland cement,
   not less than 54% by mass and not more than 58% by mass of a siliceous material,
   not less than 8% by mass and not more than 12% by mass of a woody reinforcement,
   not less than 2% by mass and not more than 5% by mass of mica, and
   not less than 0.5% by mass and not more than 1.25% by mass of a polyvinyl alcohol resin, wherein
   the siliceous material comprises fly ash and silica fume, and
   the woody reinforcement comprises needle leaves tree unbleached kraft pulp and/or needle leaves tree bleached kraft pulp and used paper, wherein
   the fly ash contains 50% to 70% by mass of $SiO_2$,
   the silica fume is contained in an amount of not less than 3% by mass and not more than 7% by mass of the siliceous material, and contains 97% by mass or more of $SiO_2$,
   the used paper is contained in an amount of not less than 20% by mass and not more than 50% by mass of the woody reinforcement, and
   the siliceous material and the portland cement contains CaO and $SiO_2$ at from 30:70 to 40:60 of a mass ratio CaO:$SiO_2$.

2. A process for manufacturing the fiber reinforced cement board according to claim 1 which comprises the following steps: preparing a slurry of raw materials by dispersing a mixture of the portland cement, the siliceous material and the woody reinforcement used as main raw materials in water; forming a green mat by forming the slurry through a flow on process; press-molding the green mat under a pressure not less than 2 MPa and not more than 5 MPa; and curing the molded product in an autoclave at a temperature not lower than 150° C.

3. The fiber reinforced cement board according to claim 1, wherein the used paper has a fiber length of not less than 0.5 mm and not more than 3.0 mm.

4. The fiber reinforced cement board according to claim 1, wherein the used paper has a fiber diameter of not less than 10 μm and not more than 100 μm.

5. The fiber reinforced cement board according to claim 1, wherein the used paper has a Canadian standard freeness of not more than 350 ml.

6. A fiber reinforced cement board having an absolute dry specific gravity of not less than 1.20 and not more than 1.30 and comprising the following raw materials:
   not less than 28% by mass and not more than 32% by mass of a hydraulic portland cement,
   not less than 54% by mass and not more than 58% by mass of a siliceous material,
   not less than 8% by mass and not more than 12% by mass of a woody reinforcement,
   not less than 2% by mass and not more than 5% by mass of mica, and
   not less than 0.5% by mass and not more than 1.25% by mass of a polyvinyl alcohol resin,
   wherein
   the siliceous material comprises blast furnace slag and silica fume, and the silica fume is contained in an amount of not less than 5% by mass and not more than 20% by mass of the siliceous material, and
   the woody reinforcement comprises needle leaves tree unbleached kraft pulp and/or needle leaves tree bleached kraft pulp and used paper, wherein
   the blast furnace slag contains 20% to 40% by mass of $SiO_2$,
   the silica fume is contained contains 97% by mass or more of $SiO_2$, the used paper is contained in an amount of not less than 20% by mass and not more than 50% by mass of the woody reinforcement, and the siliceous material and the portland cement contains CaO and $SiO_2$ at from 50:50 to 60:40 of a mass ratio $CaO:SiO_2$.

7. The fiber reinforced cement board according to claim 6, wherein the used paper has a fiber length of not less than 0.5 mm and not more than 3.0 mm.

8. The fiber reinforced cement board according to claim 6, wherein the used paper has a fiber diameter of not less than 10 μm and not more than 100 μm.

9. The fiber reinforced cement board according to claim 6, wherein the used paper has a Canadian standard freeness of not more than 350 ml.

10. A fiber reinforced cement board having an absolute dry specific gravity of not less than 1.20 and not more than 1.30 and comprising the following raw materials:

not less than 28% by mass and not more than 32% by mass of a hydraulic portland cement, not less than 54% by mass and not more than 58% by mass of a siliceous material, not less than 8% by mass and not more than 12% by mass of a woody reinforcement, not less than 2% by mass and not more than 5% by mass of mica, and not less than 0.5% by mass and not more than 1.25% by mass of a polyvinyl alcohol resin, wherein the siliceous material comprises blast furnace slag and fly ash, and the fly ash is contained in an amount of not less than 30% by mass and not more than 70% by mass of the siliceous material, and the woody reinforcement comprises needle leaves tree unbleached kraft pulp and/or needle leaves tree bleached kraft pulp and used paper, wherein the blast furnace slag contains 20% to 40% by mass or more of $SiO_2$, the fly ash contains 50 to 70% by mass or more of $SiO_2$, the used paper is contained in an amount of not less than 20% by mass and not more than 50% by mass of the woody reinforcement, and the siliceous material and the portland cement contains CaO and $SiO_2$ at from 40:60 to 60:40 of a mass ratio $CaO:SiO_2$.

11. The fiber reinforced cement board according to claim 10, wherein the used paper has a fiber length of not less than 0.5 mm and not more than 3.0 mm.

12. The fiber reinforced cement board according to claim 10, wherein the used paper has a fiber diameter of not less than 10 μm and not more than 100 μm.

13. The fiber reinforced cement board according to claim 10, wherein the used paper has a Canadian standard freeness of not more than 350 ml.

14. A process for manufacturing the fiber reinforced cement board according to claim 6 which comprises the following steps: preparing a slurry of raw materials by dispersing a mixture of the hydraulic portland cement, the siliceous material and the woody reinforcement used as main materials in water; forming a green mat by forming the slurry through a flow on process; press-molding the green mat under a pressure not less than 2 MPa and not more than 5 MPa; and curing the molded product in an autoclave at a temperature not lower than 150° C.

15. A process for manufacturing the fiber reinforced cement board according to claim 10 which comprises the following steps: preparing a slurry of raw materials by dispersing a mixture of the hydraulic portland cement, the siliceous material and the woody reinforcement used as main materials in water; forming a green mat by forming the slurry through a flow on process; press-molding the green mat under a pressure not less than 2 MPas and not more than 5 MPas; and curing the molded product in an autoclave at a temperature not lower than 150° C.

\* \* \* \* \*